(12) United States Patent
Lahann et al.

(10) Patent No.: US 7,909,928 B2
(45) Date of Patent: Mar. 22, 2011

(54) REACTIVE COATINGS FOR REGIOSELECTIVE SURFACE MODIFICATION

(75) Inventors: Joerg Lahann, Ann Arbor, MI (US); Himabindu Nandivada, Ann Arbor, MI (US); Hsien-Yeh Chen, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 971 days.

(21) Appl. No.: 11/691,210

(22) Filed: Mar. 26, 2007

(65) Prior Publication Data

US 2007/0272122 A1 Nov. 29, 2007

Related U.S. Application Data

(60) Provisional application No. 60/786,056, filed on Mar. 24, 2006.

(51) Int. Cl.
*B05D 1/02* (2006.01)
*C09D 4/00* (2006.01)
*C23C 16/00* (2006.01)

(52) U.S. Cl. ............... 106/285; 106/287.24; 427/255.28

(58) Field of Classification Search .............. 427/255.28; 106/285, 287.24
See application file for complete search history.

(56) References Cited

U.S. PATENT DOCUMENTS

| | | | |
|---|---|---|---|
| 4,746,347 A | 5/1988 | Sensi | |
| 4,792,536 A | 12/1988 | Pecoraro et al. | |
| 5,171,132 A | 12/1992 | Miyazaki et al. | |
| 5,240,886 A | 8/1993 | Gulotta et al. | |
| 5,271,724 A | 12/1993 | van Lintel | |
| 5,277,556 A | 1/1994 | van Lintel | |
| 5,375,979 A | 12/1994 | Trah | |
| 5,385,872 A | 1/1995 | Gulotta et al. | |
| 5,393,593 A | 2/1995 | Gulotta et al. | |
| 5,776,748 A | 7/1998 | Singhvi et al. | |
| 5,858,188 A | 1/1999 | Soane et al. | |
| 5,869,135 A | 2/1999 | Vaeth et al. | |
| 5,935,409 A | 8/1999 | King et al. | |
| 6,074,725 A | 6/2000 | Kennedy | |
| 6,103,479 A | 8/2000 | Taylor | |
| 6,192,168 B1 | 2/2001 | Feldstein et al. | |
| 6,291,072 B1 | 9/2001 | Kimoto et al. | |
| 6,473,696 B1 | 10/2002 | Onyia et al. | |

(Continued)

FOREIGN PATENT DOCUMENTS

DE 19604173 8/1997

(Continued)

OTHER PUBLICATIONS

Nandivada, H. et al., "Click Chemistry: Versatility and Control in the Hands of Materials Scientists," Adv. Mater., vol. 19, Issue 17, pp. 2197-2208 (2007).

(Continued)

*Primary Examiner* — Duc Truong
(74) *Attorney, Agent, or Firm* — Harness, Dickey & Pierce, P.L.C.

(57) ABSTRACT

Reactive polymer coatings that undergo regioselective reactions with target biomolecules are provided. The polymers of the coatings are deposited via chemical vapor deposition and comprise one or more functional groups that exhibit regioselective bonding with a functional group or a target molecule. Such polymers include poly-xylylenes having functional groups such as alkynes or azides. The regioselective bonding of the reactive polymers provide stable immobilization of target molecules and/or ligands and can create biofunctional surfaces having a wide range of applications.

20 Claims, 8 Drawing Sheets

U.S. PATENT DOCUMENTS

| | | | |
|---|---|---|---|
| 6,712,846 | B1 | 3/2004 | Kraus et al. |
| 6,751,558 | B2 | 6/2004 | Huffman et al. |
| 6,942,771 | B1 | 9/2005 | Kayyem |
| 6,977,138 | B2 | 12/2005 | Lahann et al. |
| 6,977,866 | B2 | 12/2005 | Huffman et al. |
| 7,020,355 | B2 | 3/2006 | Lahann et al. |
| 7,217,356 | B2 | 5/2007 | Cork et al. |
| 7,648,739 | B2 | 1/2010 | Lahann et al. |
| 2003/0044546 | A1 | 3/2003 | Lahann et al. |
| 2005/0064027 | A1 | 3/2005 | Jacob et al. |
| 2005/0118595 | A1 | 6/2005 | Lahann |
| 2005/0276835 | A1 | 12/2005 | Lahann et al. |
| 2006/0064740 | A1 | 3/2006 | Kelley et al. |
| 2006/0187325 | A1 | 8/2006 | Laue et al. |
| 2006/0192281 | A1 | 8/2006 | Lu et al. |
| 2006/0201390 | A1 | 9/2006 | Lahann et al. |
| 2006/0294588 | A1 | 12/2006 | Lahann et al. |
| 2007/0237800 | A1 | 10/2007 | Lahann |
| 2007/0272122 | A1 | 11/2007 | Lahann et al. |
| 2007/0281126 | A1 | 12/2007 | Lahann et al. |
| 2008/0242774 | A1 | 10/2008 | Lahann et al. |
| 2008/0269456 | A1 | 10/2008 | Lahann et al. |
| 2009/0118819 | A1 | 5/2009 | Merz et al. |
| 2010/0015447 | A1 | 1/2010 | Lahann et al. |
| 2010/0038830 | A1 | 2/2010 | Lahann et al. |
| 2010/0068810 | A1 | 3/2010 | Smith et al. |
| 2010/0145422 | A1 | 6/2010 | Seymour et al. |

FOREIGN PATENT DOCUMENTS

| | | |
|---|---|---|
| EP | 0519087 | 12/1992 |
| WO | WO 99/30823 | 6/1999 |
| WO | WO 99/40174 | 8/1999 |
| WO | WO 00/04389 | 1/2000 |
| WO | WO 00/04390 | 1/2000 |
| WO | WO 00/53625 | 9/2000 |
| WO | WO 00/60356 | 10/2000 |
| WO | WO 01/07891 | 1/2001 |
| WO | WO 02/094454 | 11/2002 |
| WO | WO 2004/016672 | 2/2004 |

OTHER PUBLICATIONS

Nandivada, H. et al., "Reactive Polymer Coatings that 'Click'," Angewandte Chemie International Edition, vol. 45, Issue 20, pp. 3360-3363 (2006).

Elkasabi, Y. et al., "Vapor-Based Polymer Gradients," Macromolecular Rapid Communications, vol. 30, pp. 57-63 (2009).

Elkasabi, Yaseen et al., "Chemical vapor deposition co-polymerization of functionalized [2.2]paracyclophanes," Poster No. 142al presented at AIChE Annual Meeting, Cincinnati, OH (Oct. 31, 2005).

Elkasabi, Yaseen et al., "Multipotent Polymer Coatings Based on Chemical Vapor Deposition Copolymerization", Adv. Mater., vol. 18, Issue 12, pp. 1521-1526 (2006).

Lahann, Joerg et al., "Bioactive immobilization of r-hirudin on CVD-coated metallic implant devices", Biomaterials, vol. 22, pp. 817-826 (2001).

Lahann, Joerg et al., "Microengineered Surfaces for Biomedical Applications Based on a Polymeric Active Ester", Polymer Reprints, Am. Chem. Soc., vol. 42, No. 2, pp. 113-114 (2001).

Lahann, Joerg, "Vapor-based polymer coatings for potential biomedical applications", Polym. Int., vol. 55, pp. 1361-1370 (2006).

Lahann, Jorg et al., "Chemical vapour deposition polymerization of substituted [2.2]paracyclophanes", Macromol. Rapid Commun., vol. 19, pp. 441-444 (1998).

Lahann, Jorg et al., "Synthesis of Amino [2.2]paracyclophanes—Beneficial Monomers for Bioactive Coating of Medical Implant Materials", Agnew. Chem. Int. Ed., vol. 40, No. 4, pp. 726-728 (2001).

Lahann, Jorg, "Reactive Polymer Coatings for Biomimetic Surface Engineering", Chem. Eng. Comm., vol. 193, Issue 11, pp. 1457-1468 (2006).

Non-Final Office Action for U.S. Appl. No. 12/054,171 (U.S. Pub. No. 2008/0269456) dated Jul. 22, 2009.

Response filed on Oct. 22, 2009 to Non-Final Office Action dated Jul. 22, 2009 for U.S. Appl. No. 12/054,171 (U.S. Pub. No. 2008/0269456).

Final Office Action for U.S. Appl. No. 12/054,171 (U.S. Pub. No. 2008/0269456) dated Jan. 6, 2010.

Response filed on Apr. 1, 2010 to Final Office Action dated Jan. 6, 2010 for U.S. Appl. No. 12/054,171 (U.S. Pub. No. 2008/0269456).

Advisory Action for U.S. Appl. No. 12/054,171 (U.S. Pub. No. 2008/0269456) dated Apr. 7, 2010.

Request for Continued Examination filed on May 6, 2010 for U.S. Appl. No. 12/054,171 (U.S. Pub. No. 2008/0269456).

Non-Final Office Action for U.S. Appl. No. 11/756,890 (U.S. Pub. No. 2007/0281126) dated Mar. 29, 2010.

Response filed on Jun. 29, 2010 to Non-Final Office Action dated Mar. 29, 2010 for U.S. Appl. No. 11/756,890 (U.S. Pub. No. 2007/0281126).

REACTIVE COATINGS FOR REGIOSELECTIVE SURFACE MODIFICATION

CROSS-REFERENCE TO RELATED APPLICATIONS

This application claims the benefit of U.S. Provisional Application No. 60/786,056, filed on Mar. 24, 2006, the disclosure of which is incorporated herein by reference in its entirety.

GOVERNMENT RIGHTS

This invention was made with government support under Contract Nos. DMR-0449462 and DMR-0420785 awarded by the National Science Foundation. The government has rights in the invention.

FIELD

The present disclosure relates to chemical vapor deposition (CVD), and more particularly to reactive polymers deposited by CVD that provide regioselectivity.

BACKGROUND

The statements in this section merely provide background information related to the present disclosure and may not constitute prior art.

The ability to generate patterns or modular design of molecules, biological ligands, proteins or cells on surfaces is important for various technologies. For example, in biomedical engineering, such pattern control is necessary for the development of certain types of biosensors or fundamental studies of cell biology, which require spatially controlled attachment of ligands. Other similar examples include surface patterning for some biological assays and for combinatorial screening of drugs. In tissue engineering, the formation of tissue or organized cell structures often requires a specific architecture that allows cells to occupy defined locations on an implant or device, while preventing non-specific adhesion. Further, control over spatial arrangement can be useful for monomolecularly dimensioned interlayers for self-assembled monolayers (SAMs).

Design of biologically-active interfaces requires strategies for the specific and robust attachment of biological ligands onto the surfaces. Thus, stable immobilization of one or multiple types of biomolecules to a surface has been identified as a critical challenge in various applications, including the regulation of cell shapes, the development of advanced biological assays, scaffolds for regenerative medicine, medical implant and device coatings, the development of microelectronic elements such as optical displays, circuits, or lasers, the fabrication of complex three-dimensional microstructures or microfluidic devices, or the fabrication of increasingly complex micro-total analytical systems (µTAS) that automate laboratory analysis steps on a microscale.

Many requirements for an immobilization strategy include achieving stability of attached biomolecules and the specificity of the immobilization chemistry while preserving the native conformation of the ligands.

It is desirable to improve immobilization of various molecules and/or ligands to further control design of modular layers, including control over immobilization of a plurality of molecules and/or ligands, most preferably having control over spatial orientation of the bonded molecules via stable and reliable reactions. In various aspects, the present disclosure provides such materials and methods for making and using these improved materials.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 3A:
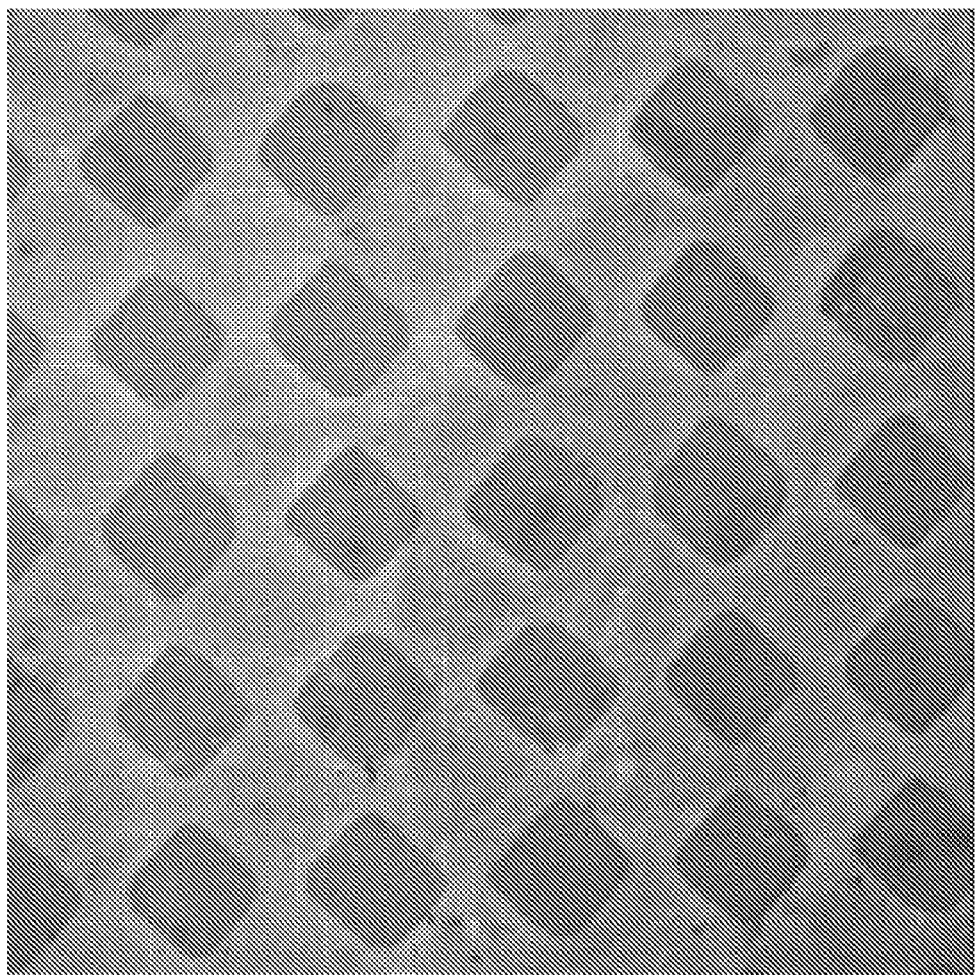
Figure 3B:
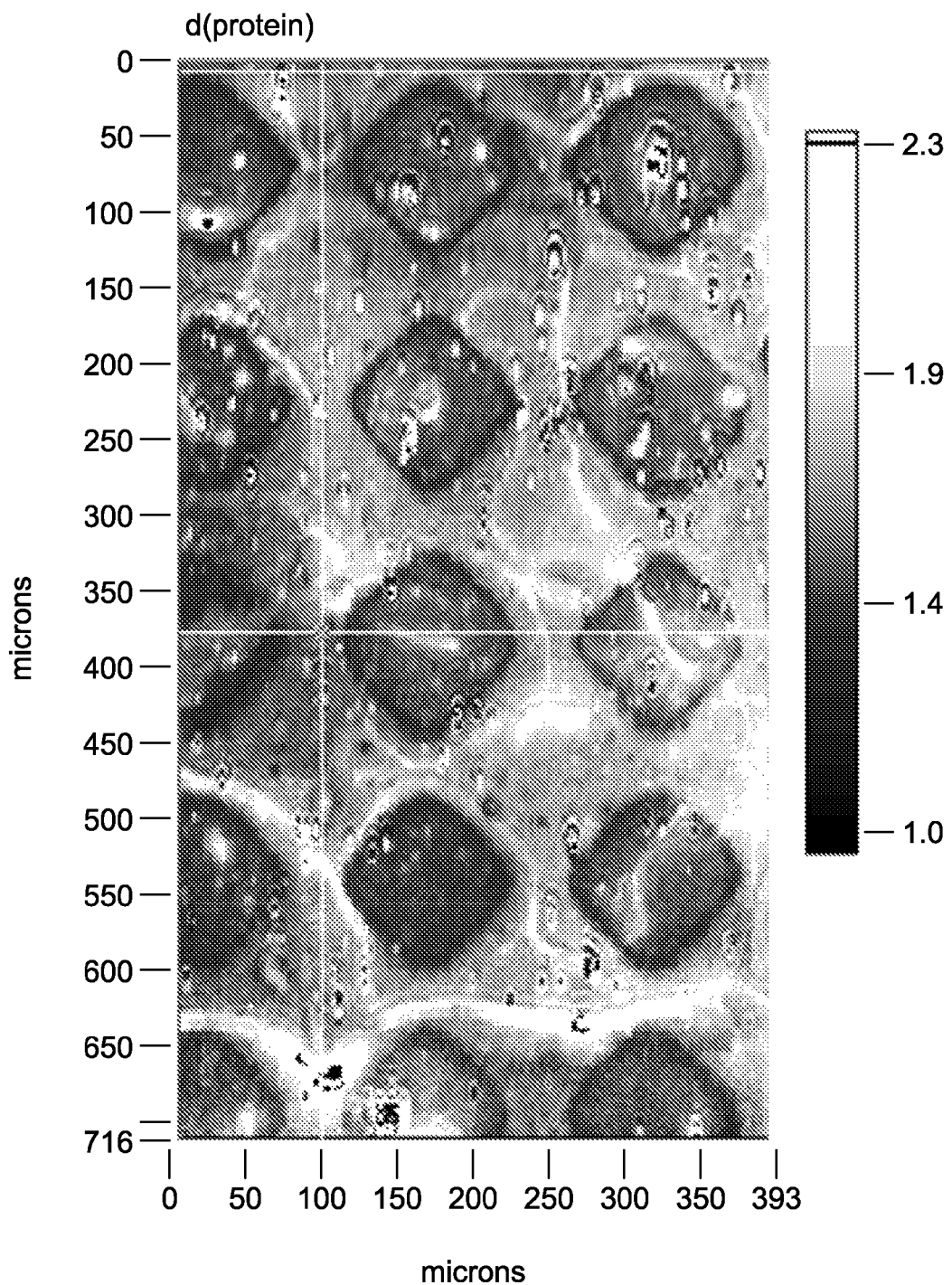
Figure 3C:
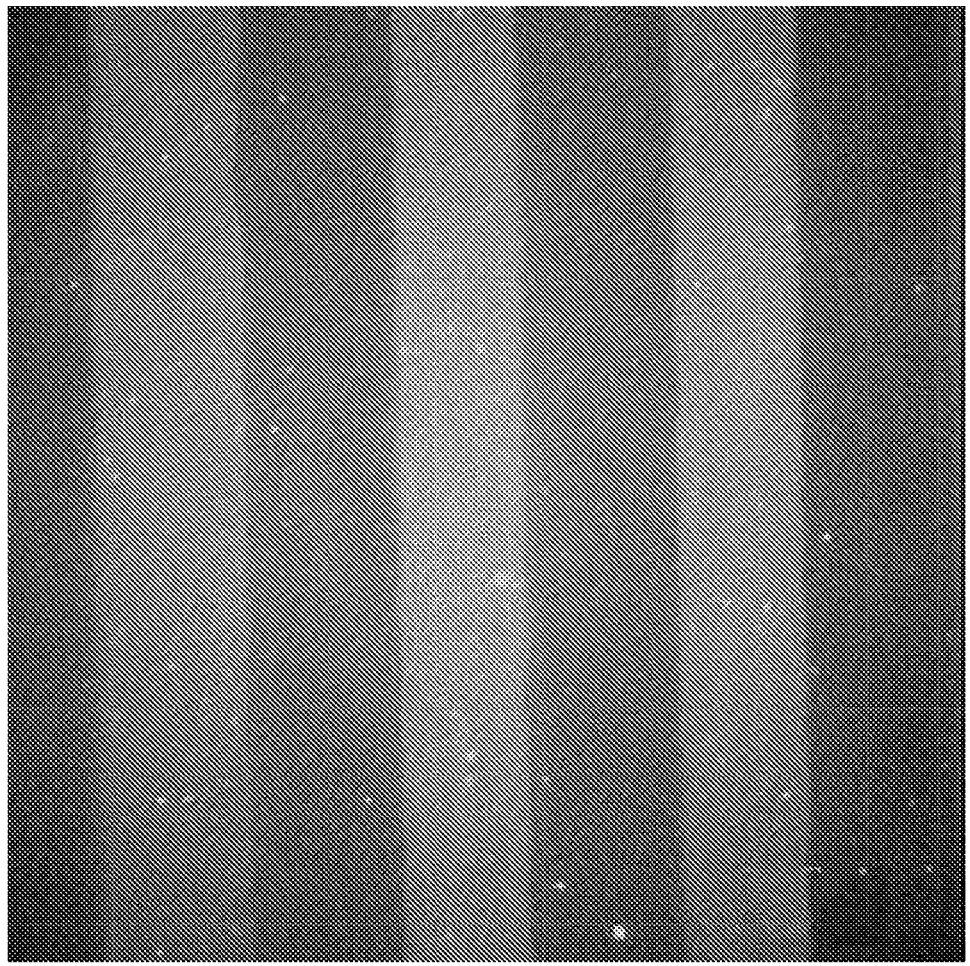
Figure 3D:
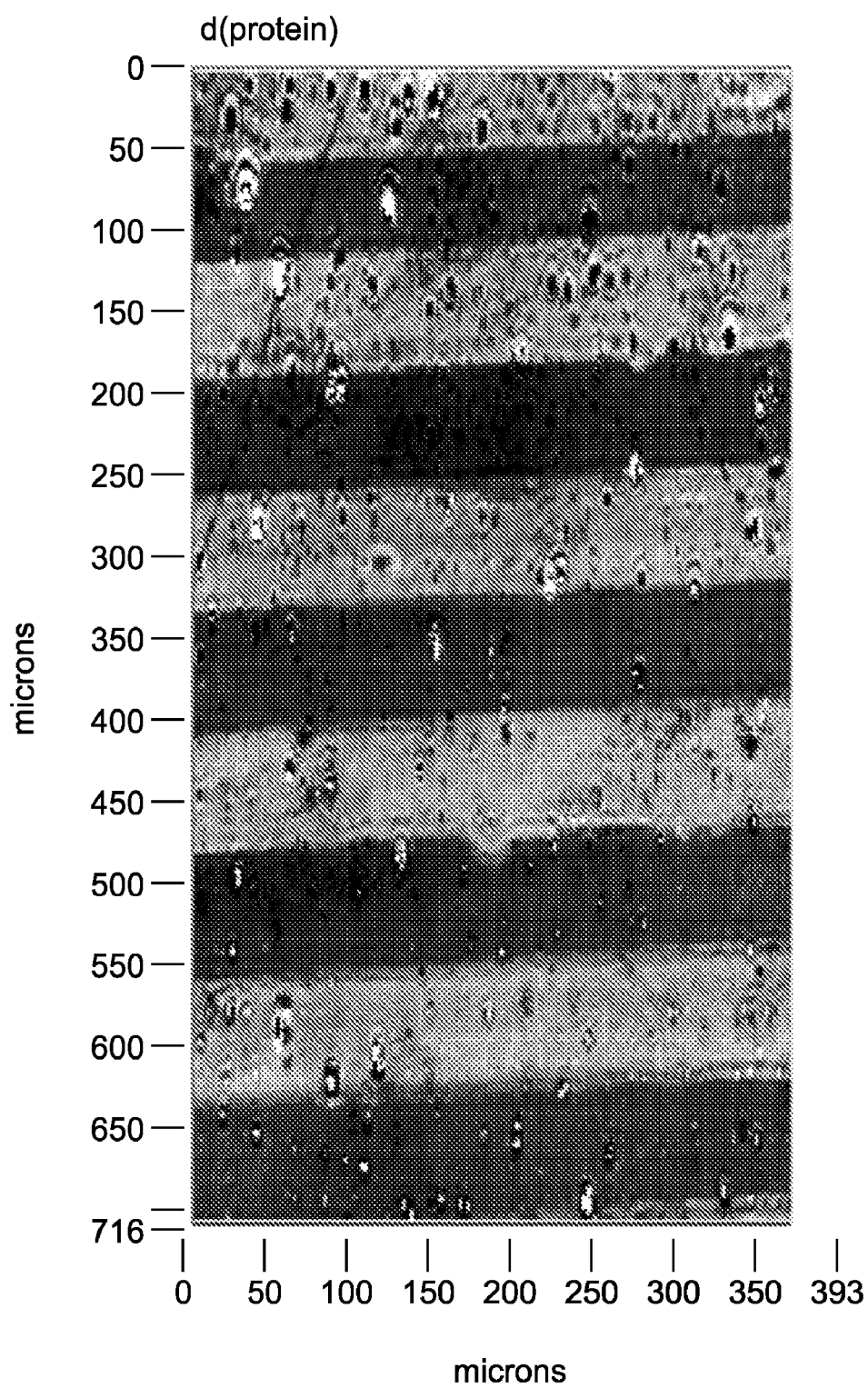
Figure 4:
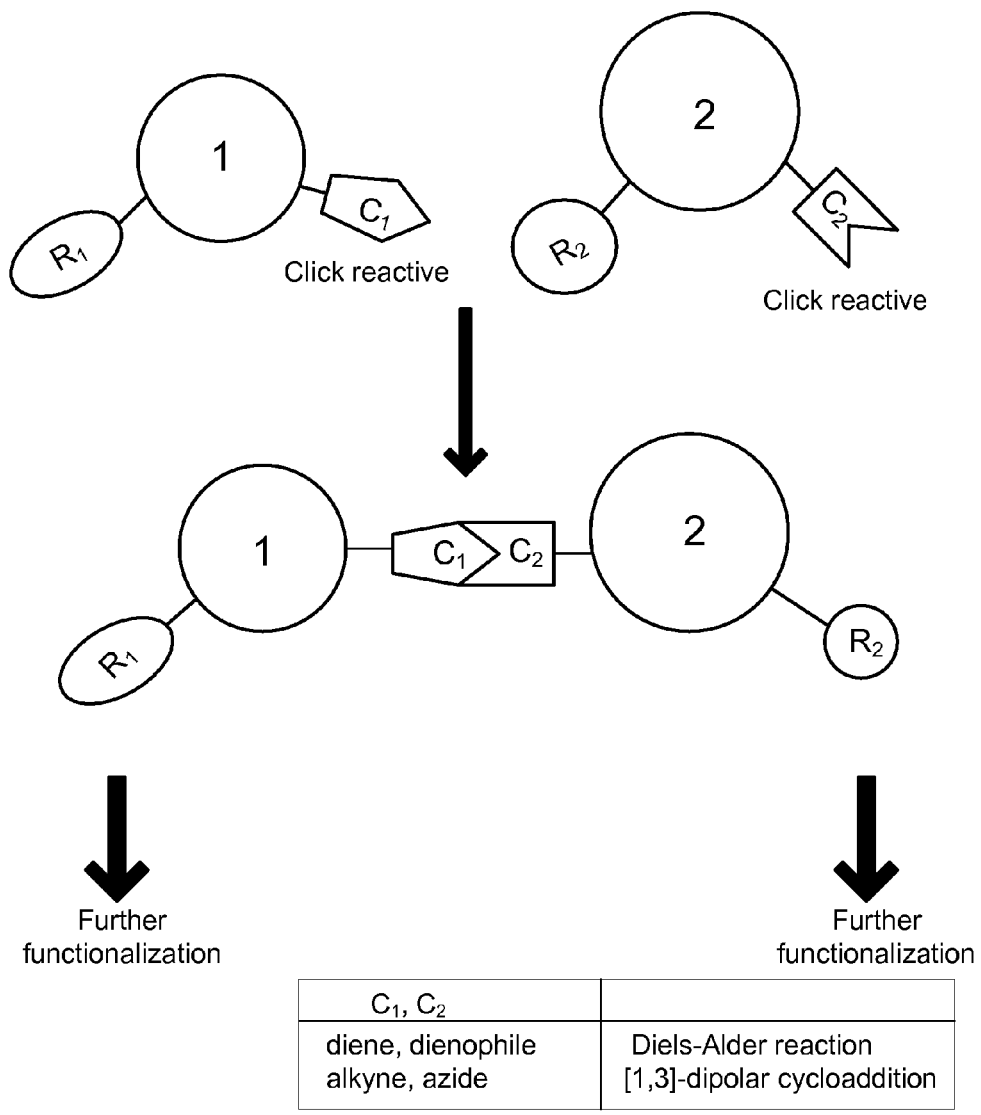

FIGS. 3A through 3D show different patterns of polymer films formed by microcontact printing in accordance with certain aspects of the disclosure. FIGS. 3A and 3C are fluorescence micrographs showing the binding of TRITC-steptavidin in the light regions (and non-binding in dark regions). FIGS. 3B and 3D show imaging of similar respective patterns via ellipsometric imaging;

FIG. 4 shows an exemplary schematic of a click chemistry reaction; and

Figure 5:
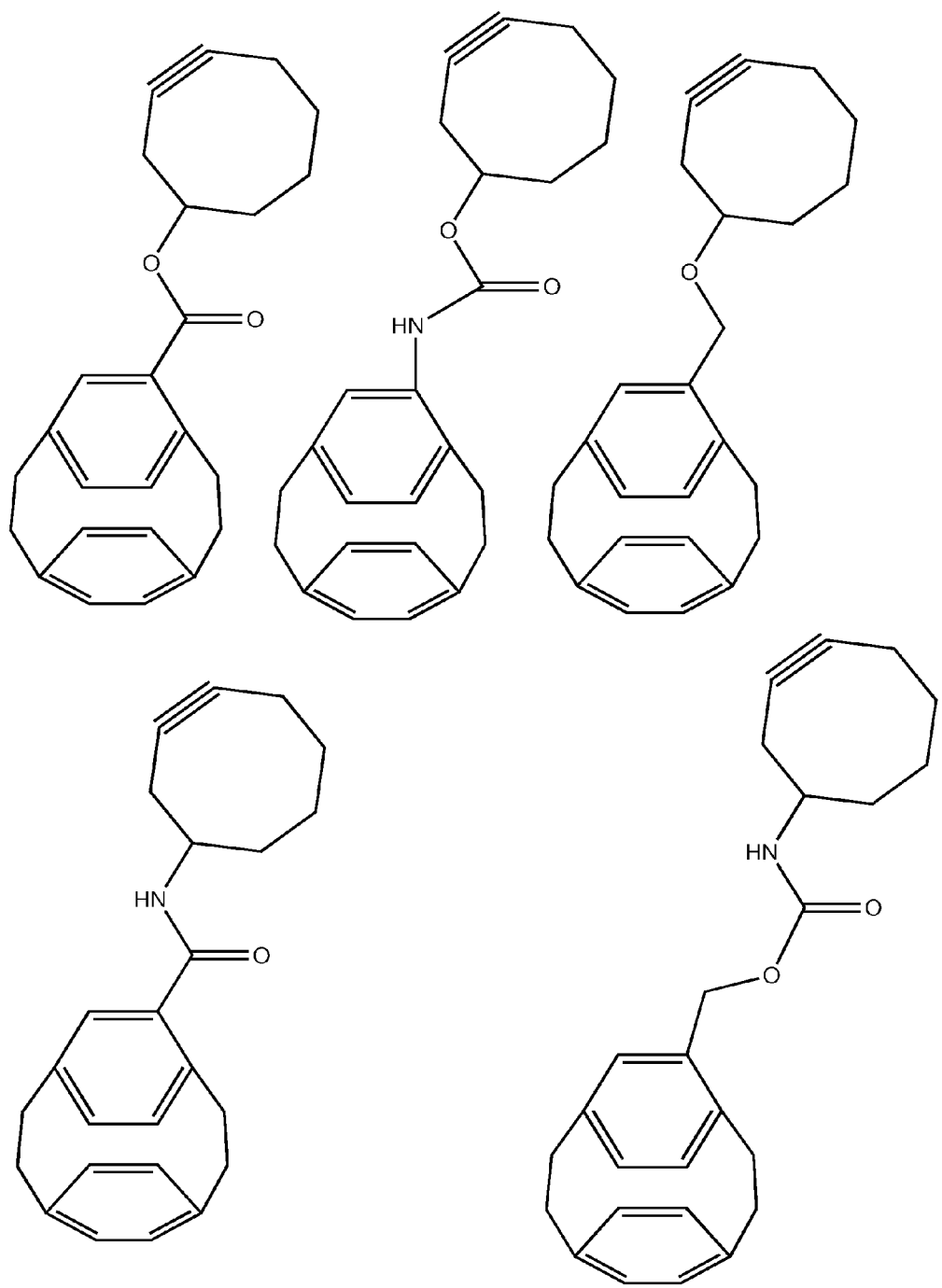

FIG. 5 shows exemplary molecules that can be formed in accordance with certain teachings of the disclosure.

DETAILED DESCRIPTION

The following description is merely exemplary in nature and is not intended to limit the present disclosure, application, or uses. It should be understood that throughout the drawings, corresponding reference numerals indicate like or corresponding parts and features.

In various aspects, the disclosure provides a robust functionalized polymer composition deposited on a substrate. In certain aspects, making polymer films comprising such robust functionalized polymer compositions permits spatial control of self-assembly of monolayers onto a substrate. Thin films of such polymer systems are formed via chemical vapor deposition (CVD) by polymerization of reactive precursors. Such CVD methods can be used to coat various substrates with polymer systems. CVD coating procedures with such polymer systems are a one-step coating process that provides good bulk properties of a material and enhanced contact properties. Various aspects of the disclosure provide for improved design of biologically-active interfaces, including providing robust and specific attachment of certain target molecules, such as biological ligands, onto treated surfaces.

In various aspects, the polymer composition of the present disclosure comprises a polymer deposited by chemical vapor deposition comprising a substituted xylylene, which comprises a first functional group that is reactive with a target molecule comprising a second functional group. In certain aspects, the target molecule is, by way of example, a biomolecule and/or a ligand, such as DNA, RNA, proteins, amino acids, growth factors, oligopolysaccharides, hormones, and the like, for example. In various aspects, the first and second functional groups undergo a click chemistry reaction.

"Click chemistry" refers to reactive molecular building blocks designed to "click" together by selective covalent bonding to join the small units together, similar to bonding often found in nature. Click chemistry represents a family of powerful and efficient chemical reactions that are modular and wide in scope, and have the benefit of being insensitive to solvents and pH conditions. Click chemistry reactions give stereoselective conversion with high to very high yields. In accordance with various aspects of the disclosure, such click chemistry reactions between functional groups provide a versatile tool for tailoring surface functionalities. Click chemistry provides reaction mechanisms that have the following properties: i) stable linkages; ii) minimal cross-reactivity with other functional groups; iii) high conversions/yields that react to completion; iv) absence of appreciable amounts of side product(s); and v) proceed under relatively benign reaction conditions.

Generally, click reactions are driven by a high thermodynamic force (e.g., >20 kcal mol$^{-1}$), which gives rise to highly modular and sterospecific reactions with high yields. Click chemistry is not limited to a specific type of reaction, but rather defines a broader synthetic concept or framework that defines a range of different reactions, with different reaction mechanisms. FIG. 4 shows a schematic of an exemplary click chemistry regioselective reaction. While not limiting, five broad classes of reactions are contemplated by "click chemistry." Such reactions include: 1) cycloaddition of unsaturated species: [1,3]-dipolar cycloaddition; 2) cycloaddition of unsaturated species: [2,4]-cycloaddition (Diels-Alder); 3) nucleophilic substitution reaction-ring opening reactions; 4) carbonyl reactions of the non-aldol type; and 5) addition to carbon-carbon multiple bonds. These reactions are conceptually demonstrated in FIG. 4, where further functionalization may occur. Such reactions are generally understood to undergo a regioselective reaction. Common features of click reactions are synthetic versatility, benign reaction conditions, high yields, and functional group tolerance.

A "regioselective" reaction is generally defined as a reaction in which one direction of bond making or breaking occurs preferentially over all other possible directions. Such reactions are generally completely (100%) regioselective if the discrimination over other competing reactions is complete, or partially regioselective (x %) if the product of reaction has a preferred orientation relative to the surface, i.e., one site predominates over the product of reaction at other sites. Generally, the present disclosure contemplates a first functional group having high regioselectivity (thus, including both complete and partial regioselectivity) towards a second functional group, where the regioselectivity of the reaction is a conversion of greater than or equal to about 60%, optionally greater than or equal to about 75%, optionally greater than or equal to about 80%, optionally greater than or equal to about 90%, and optionally greater than or equal to about 95%. "Click chemistry" includes such modular regioselective reactions, which provide robust layers that are relatively insensitive to solvents and pH, while resulting in stereoselective conversions with high to very high yields.

In accordance with the present disclosure, one suitable reaction is a cycloaddition reaction between an alkyne functional group and an azide functional group, as will be described in more detail below. Reactive coatings formed with functional groups that undergo such regioselective reactions are applicable to a wide range of substrates and can be modified by subsequent spatially-directed click chemistry. Bioorthogonality, the concept of pairs of functional groups that undergo selective chemical reaction in biological systems, depends on the proximity and proper alignment of the reactants. Such bioorthogonality makes click reactions desirable for biointerface design. In accordance with various aspects of the disclosure, polymer coatings that undergo surface-directed dipolar cycloadditions are provided.

In various aspects, the disclosure provides a method of forming a robust surface bond by applying a first polymer comprising a first functional group via chemical vapor deposition to a first substrate. A target molecule comprises a second functional group that undergoes a regioselective reaction with the first functional group. The first functional group is reacted with the second functional group to bond the polymer on a substrate with the target molecule, thereby giving the desired orientation of the target molecule. Further, in alternate aspects, a target molecule might be adhered or bonded to a second surface (optionally a functional group on a polymer) to provide bonding between a first surface and a second surface via reaction of the respective first and second functional groups via a regioselective reaction, as will be discussed in more detail below.

One non-limiting exemplary embodiment of an applicable click reaction is the regioselective Huisgen 1,3-dipolar cycloaddition between azides and terminal alkynes. This coupling reaction can be used in various applications, such as use in applications related to drug discovery, for target-guided synthesis of enzyme-inhibitors, and for self-assembled monolayers (SAMs), among others, as will be discussed in greater detail below.

In certain aspects, chemical vapor deposition (CVD) polymerization is used to form polymer films on substrates that comprise substituted xylylenes (poly-xylylenes) which enable the immobilization of biomolecules. Such coating technology results in a diverse class of polymers comprising functionalized p-xylylenes. These polymers generated by CVD polymerization provide a flexible solution to surface engineering challenges, as they decouple surface design from bulk properties. In essence, the CVD technology is a one-step coating procedure to generate functionalized surfaces without the need of further post-treatments once the films are deposited. CVD polymerization with similar xylylene polymer systems is described in U.S. Pat. No. 6,977,138 to Lahann et al., which is herein incorporated by reference in its entirety. For example, in certain embodiments, substituted [2,2]paracyclophanes deposited via CVD create a wide array of functionalized poly-(p-xylylenes).

Thus, in various aspects, the present disclosure relates to a new type of biofunctional surface based on click chemistry functional groups containing vapor-based polymer coatings. As appreciated by those of skill in the art, such polymer coatings may further comprise various other functional groups that can undergo reaction with various target molecules.

However, in accordance with the principles of the present disclosure, reactive polymer films that employ click chemistry-based immobilization are formed by CVD polymerization to create polymer coatings having functional groups that undergo regioselective reactions. Functional groups which undergo regioselective reactions include, by way of example, alkynes (containing a C≡C group, such as C≡CH or C≡CR, where R is an alkyl group defined by $C_nH_{2n+1}$), azides ($N_3$), ketones, hydrazides, dienes, dienophiles, and mixtures thereof. One such robust polymer composition according to the present disclosure is a polymer having a general structure:

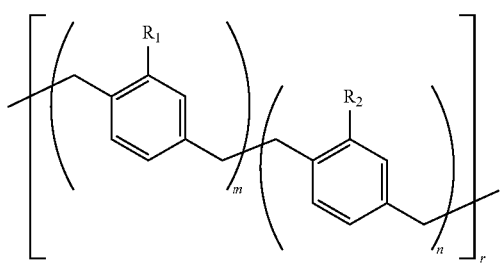

where $R_1$ is selected from the group consisting of: H; C≡CH; C≡CR; where R is an alkyl group defined by $C_nH_{2n+1}$, where "n" ranges from 3 to 8; an azide ($N_3$); and mixtures thereof; and $R_2$ is selected from the group consisting of: H; C≡CH; C≡CR; where R is an alkyl group defined by $C_nH_{2n+1}$, where "n" ranges from 3 to 15; an azide ($N_3$), and mixtures thereof. "m" and "n" are 0 to about 150 and "r" is about 1 to about 2000.

In various aspects, the polymers of the present disclosure optionally comprise a plurality of distinct functional groups, such as a combination of distinct regioselective functional groups on the polymer. Optionally, the polymer systems optionally comprise additional non-regioselective functional groups known to those of skill in the art, which do not undergo click chemistry/regioselective reactions, but rather undergo different reactions (non-stereoselective reactions), such as those functional groups described in U.S. Pat. No. 6,977,138 to Lahann et al., which include by way of example, amines, esters, aldehydes, halides, and alcohols, such as: CHO, $COCH_3$, $COC_2H_5$, $COC_nH_{2n+1}$, where "n" ranges from 3 to 8, $COCF_3$, $COC_2F_5$, $COC_nF_{2n+1}$ where "n" ranges from 3 to 8, $COC_6H_5$, $NH_2$, $CH_2$, $NH_2$, $CH_2OH$, $CH_2OCH_3$, $CH_2OCOCH_3$, $COOCH_3$, $CH_2OCOCOOC_6F_6$, $CH_2OCOCF_3$, Cl, Br, F and H, and mixtures thereof.

An exemplary reaction mechanism for forming such a polymer is shown below:

(Reaction 1)

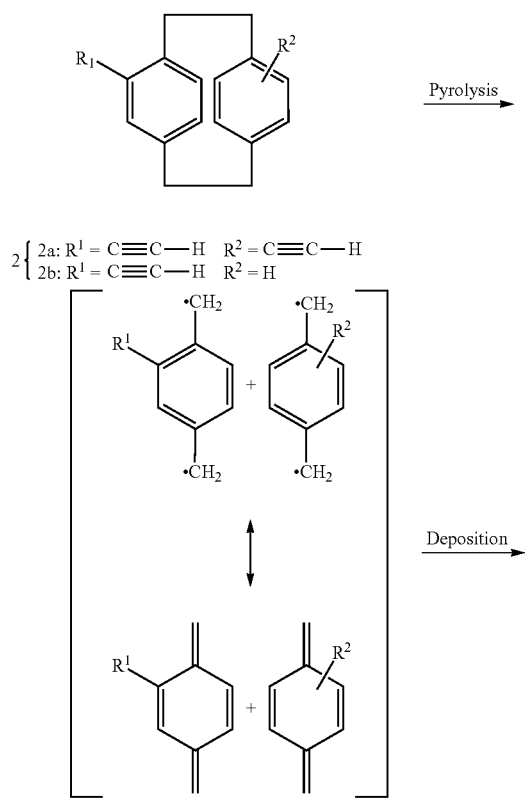

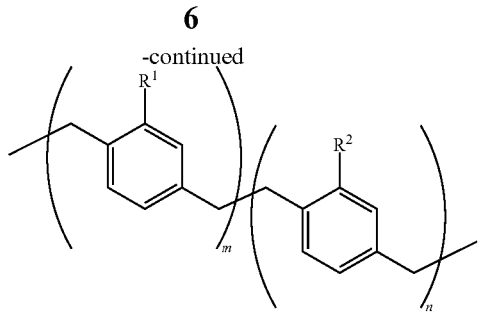

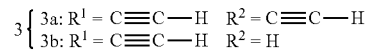

where "m" and "n" are the respective molecular weight of the first xylylene moiety having $R^1$ functional group and the second xylylene moiety having the $R^2$ moiety.

As appreciated by those of skill in the art, the terminal alkyne functional group is capable of reacting with an azide (present on a target binding molecule or ligand) via a spatially-directed Huisgen 1,3-dipolar cycloaddition where a triazole is formed. In this regard, the polymer present on a surface can selectively react with azides on a target molecule and/or ligand for selective immobilization. Alternatively, in the Huisgen 1,3-dipolar cycloaddition reaction, the azide group may be attached to the xylylene molecule (as $R_1$ or $R_2$, for example), which then reacts with a target molecule containing an alkyne functional group. Such functional groups may be naturally occurring in the molecule or alternately, a molecule can be functionalized with the desired functional group.

Where a target molecule is functionalized to contain a second functional group, the site on the molecule where the functional group is located enables control over which areas of the molecule (usually having a tertiary structure) are exposed at the surface for subsequent interaction/reactions. In this manner, a multi-functional molecule having other reactive sites can have certain regions selectively exposed for exposure to the surrounding environment. Thus, a second functional group, such as an azide, can be incorporated into a molecule, for example in a protein, at a specific position that will enable a regioselective reaction at that portion of the molecule resulting in a preselected orientation that exposes the desired areas of the molecule (often having other functional groups or bioactive regions). Such high control over the spatial molecular orientation is a beneficial advantage of the polymer systems of the present disclosure.

Prior to polymer deposition using CVD polymerization, a starting material comprising ethynyl[2,2]paracyclophane (designated (2b) in Reaction 1 above and referred to herein as (2)) is prepared from the commercially available [2,2]paracyclophane which is first converted to the respective di- and mono-formyl derivatives followed by Bestmann's acetylene synthesis. Ethynyl[2,2]paracyclophane (2b) is believed to primarily form poly(4-ethynyl-p-xylylene-co-p-xylylene (3b). Under the conditions of the dialkyne synthesis, pseudo-ortho and pseudo-meta derivatives are believed to be the major isomers, however these isomers are not separated for subsequent CVD polymerization. Other potential polymer systems in the starting material (2) include di-ethynyl[2,2]paracyclophane (designated (2a)) that is believed to form (3a) poly(diethynyl-p-xylylene) of product (3) by CVD polymerization.

The alkyne containing reactant (2) is CVD polymerized. Poly(4-ethynyl-p-xylylene-co-p-xylylene) (designated (3b)

in Reaction 1) is prepared under typical CVD conditions (pressure of 0.5 mbar), sublimation (at substrate temperatures of about 90° C. to about 110° C.), pyrolysis (at substrate temperatures of about 680° C.); and substrate temperatures of about −60 to 50° C., and often about 15° C. for polymerization. No appreciable side reactions are observed at these conditions. Moreover, an FTIR spectrum of (3b) which is the top spectrum of FIG. 1, indicates a strong alkyne C—H stretch at 3286 cm$^{-1}$ and a signal at 2100 cm$^{-1}$, which can be attributed to the carbon triple bond. This FTIR data is reaffirmed by X-ray photoelectron spectroscopy (XPS), which is used to quantify the surface elemental composition of (3b). Polymer (3b) appears to consist of about 98.7% carbon and about 1.3% oxygen. The traces of oxygen may be due to contaminations during CVD polymerization or subsequent sample handling. This data compared well with the theoretical composition of (3b) (100% carbon, hydrogen is not detected with XPS). Moreover, the high resolution C1s spectrum of (3) further reveals a symmetric and narrow peak centered at 285.6 eV with a full width at half maximum (FWHM) of 1.13 eV. This can be associated with the presence of a single type of carbon, i.e., carbon that is bound to carbon or hydrogen. The C1s peak spectrum further showed a smaller signal centered at 291.7 eV, which can be attributed to π-π* shake-up signal characteristic of aromatic π electrons. Polymer (3b) has an ellipsometric thickness of 91.81±0.03 nm (for 50 mg of precursor) and is stable in aqueous solutions and organic solvents such as acetone, ethanol, methanol and chloroform.

Figure 1:
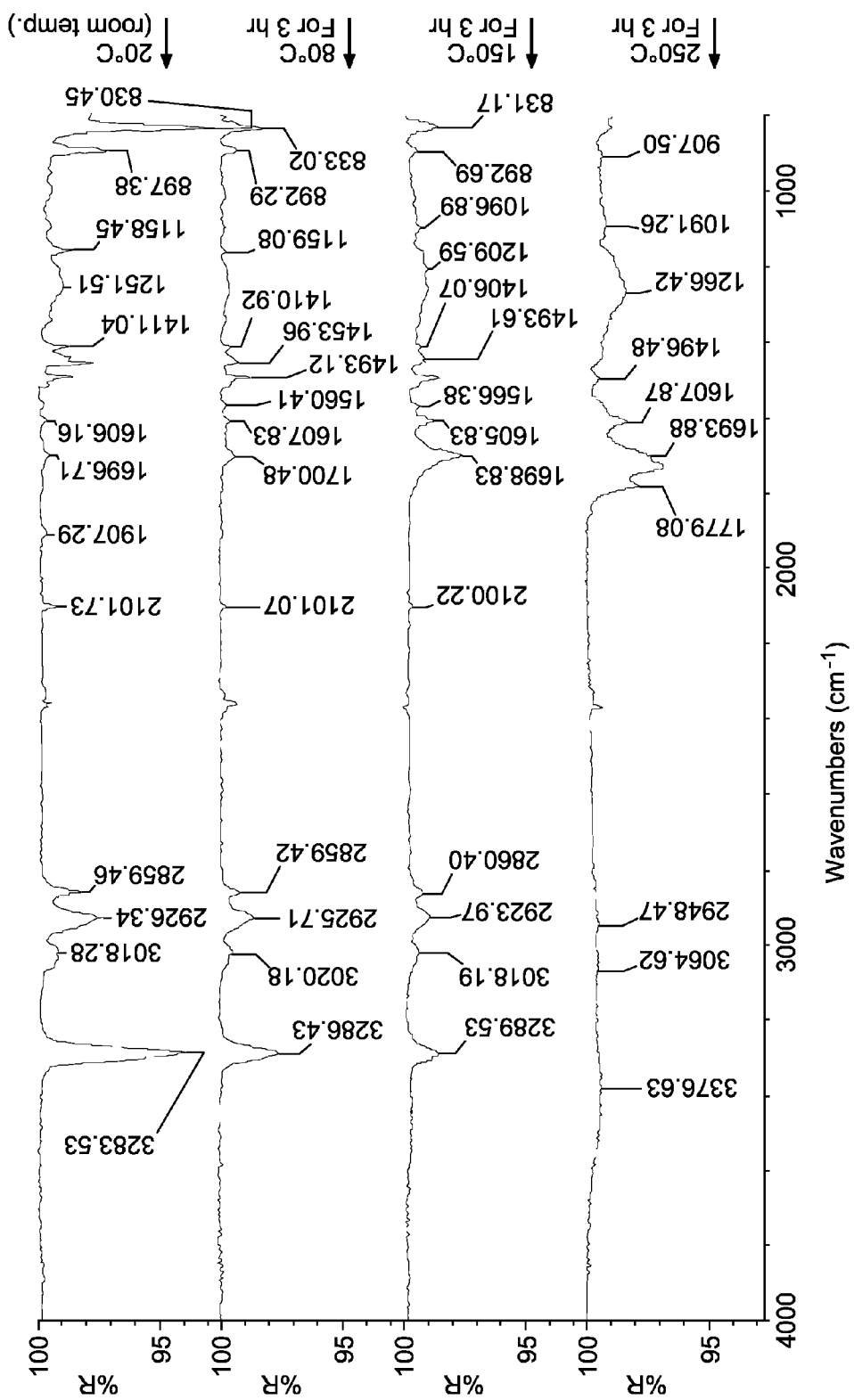
FIG. 1 shows an FTIR spectra of various samples prepared in accordance with the principles set forth in the disclosure, where the samples are stored at 20° C., 80° C., 150° C., and 250° C., respectively.

Overall, polymers formed by the methods of the disclosure having alkyne functionality (3) exhibit good adhesiveness, as tested by using the scotch tape test, well known to those of skill in the art. In such testing, polymer (3) shows good adhesion to a wide variety of substrates such as glass, poly (dimethylsiloxane) (PDMS), silicon and gold. Moreover, such polymers show a characteristic excitation peak at 380 nm and a characteristic emission peak at 450 nm (for polymer (3b)). These peaks disappeared after heating the polymer to 150° C. for about 3 hours, presumably due to cross-linking of the polymer. To assess the thermal stability of polymer (3b), FTIR spectra of various samples that are stored at 20° C., 80° C., 150° C., and 250° C. are compared, as shown in FIG. 1. The C—H stretch at 3283 cm$^{-1}$ continuously decreases with increasing temperature and was absent in samples stored at 250° C. Again, this suggests that the polymer may undergo crosslinking of the ethynyl groups at sustained elevated temperatures.

The reactive coating polymer comprises functional groups having alkynes that can be used for heterogeneous click reactions with azides. An exemplary reaction mechanism is shown below in Reaction 2, where a terminal alkyne on the xylylene reacts with the biotin azide (the azide group) in the presence of copper sulfate and sodium ascorbate.

(Reaction 2)

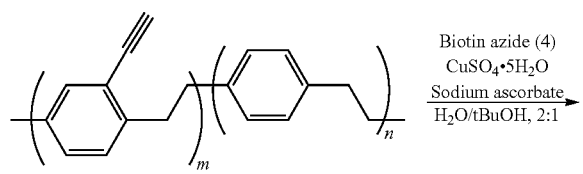

Biotin azide (4)
CuSO$_4$·5H$_2$O
Sodium ascorbate
H$_2$O/tBuOH, 2:1

-continued

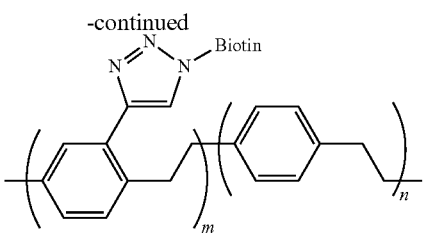

Specifically, a Huisgen 1,3-dipolar cycloaddition between a terminal alkyne on the xylylene polymer and an azide-containing biotin-based ligand (4) occurs in the presence of copper(II) sulfate and sodium ascorbate. It is believed that an irreversible exergonic fusion reaction occurs in the presence of a copper(I) catalyst to yield five-membered heterocyclic triazoles. Sodium ascorbate acts as a reductant, generating Cu$^I$ ions in situ from CuSO$_4$, which then function as the active catalyst of the cycloaddition. Compound (4) is chosen as the representative ligand, because biotin undergoes a strong non-covalent interaction with streptavidin, which in turn has been widely used for binding of a wide range of biotinylated biomolecules.

Figure 2:
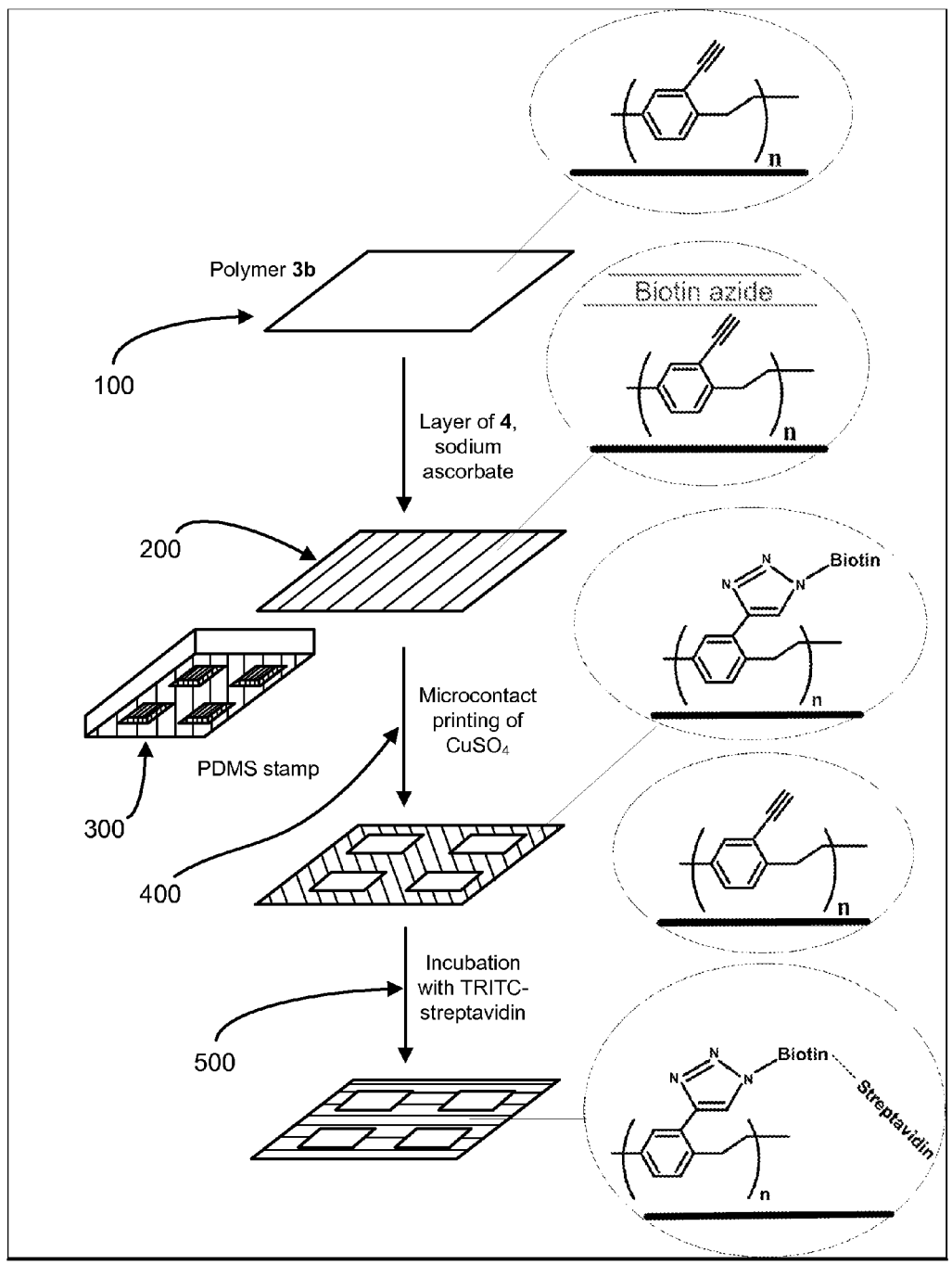
FIG. 2 shows a schematic of a process for microcontact printing according to certain aspects of the present disclosure.

In certain aspects, the present disclosure provides a method of microcontact printing (μCP) which demonstrates spatial control over cycloaddition reactions. FIG. 2 shows an exemplary microcontact printing process according to the present disclosure. Cu$^I$ catalyst and azide reactant (4) (i.e., the functionalized target molecule) are decoupled from one another. A polymer (3) is CVD deposited onto a substrate at 100. Then, a thin layer of preadsorbed ligand (4) and sodium ascorbate in solution are spread onto the applied polymer having alkyne functionality (3) at 200. The solvent is dried using N$_2$ (not shown). Next, a patterned polydimethylsiloxane (PDMS) stamp is inked with a solution of CuSO$_4$ at 300 and kept in contact with the substrate for 12-18 hours at 400. After rinsing, the patterned substrate is incubated with an aqueous solution of rhodamine-labeled streptavidin at 500.

Fluorescence microscopy is used to assess the spatially-directed immobilization of (4) onto polymer (3). The fluorescence micrographs shown in FIGS. 3A and 3C confirm that selective protein coupling occurs in the regions where the CuSO$_4$ solution is microcontact printed, thus demonstrating effective binding of (4) to polymer (3). As can be seen, various patterns on the stamp achieve various designs on the substrate. Alkyne groups on the polymer surface are reactive with azides and can be effectively used as anchoring sites for surface modifications. The two-step approach (pre-adsorption and then microcontact printing of the catalyst) appears to be particularly effective. Another approach, the concurrent microcontact printing of a catalyst and azide is also contemplated. Furthermore, the catalytic activity of Cu$^I$ ions promotes the heterogeneous click reaction. As can be observed in FIGS. 3A and 3C, regions without Cu$^I$ catalyst did not show fluorescence, likely due to a lack of azide binding in the absence of the catalyst. To complement the fluorescence study, patterned surfaces are further analyzed by imaging ellipsometry in the mapping mode. The corresponding ellipsometric images shown in FIGS. 3B and 3D reveal protein patterns, which are in-line with the corresponding fluorescence patterns. The observed thickness differences of about 1-2 nm between the biotinylated regions with streptavidin and the non-biotinylated polymer regions are comparable expected thicknesses of protein monolayers.

In another embodiment, robust polymer films are made by CVD polymerization of paracyclophanes, which have appended side groups that have sterically constrained alkynes. The appended side groups can be covalently bond to the paracyclophane ring through a range of linkages, include, but not limited to ester, amide, urethane, urea, carbonate, ether, imine, disulfide, or sulfide bonds. By way of non-limiting example, FIG. 5 shows some possible molecules that are herein contemplated. Other ring configurations, such as different ring positions of the alkyne bond or different ring sizes are also contemplated by the teachings of the present disclosure.

In accordance with various aspects of the disclosure, alkyne-containing polymer systems, such as polymer (3), show good reactivity towards azides via the chemoselective Huisgen's 1,3-dipolar cycloaddition. Various aspects of the disclosure provide methods of forming desirable, reactive polymer coatings that exhibit excellent adhesion and stability. Such spatially-controlled cycloadditions can be conducted under mild reaction conditions and will enable the design of topologically differentiated biointerfaces.

In certain aspects of the present disclosure, a method of forming a robust reactive polymer on a substrate is provided. The method comprises applying a polymer via chemical vapor deposition, where the polymer comprises a first functional group that undergoes a regioselective reaction with a second functional group on a target molecule. In certain aspects, prior to the applying of the polymer, a precursor species that forms the polymer is sublimed. In certain aspects, prior to applying the polymer, a precursor species that forms the polymer is pyrolyzed. Thus, prior to applying the polymer, the precursor species that forms the polymer is optionally: i) sublimed at about 90° C. to about 110° C.; ii) pyrolyzed at a temperature of greater than about 650° C. at about 0.5 mbar; and iii) polymerized at a temperature of about 0° C. to about 25° C.

In various aspects of the disclosure, a method is provided for forming a robust biofunctional surface comprising applying a polymer via chemical vapor deposition to a substrate, where the polymer comprises a first functional group that undergoes a regioselective reaction with a second functional group on a target molecule. Further, the first functional group is reacted with a second functional group to attach the target molecule to the surface. In certain aspects, the method further includes applying a catalyst to the substrate after the polymer is applied, but prior to the reacting. Optionally, the applying of the catalyst is conducted by contacting one or more regions of a template surface having a catalyst disposed thereon with the applied polymer on the substrate. In certain aspects, the applying comprises applying the catalyst and a catalyst reductant to the applied polymer.

In other aspects, the disclosure provides methods of a robust surface bond between two distinct surfaces, by first applying a first polymer comprising a first functional group via chemical vapor deposition to a first substrate. A second functional group (which can be part of a target molecule) is applied via CVD to a second substrate, wherein the first group has regioselectivity with the second functional group. The first functional group is reacted with the second functional group to bond the first substrate with the second substrate, thereby giving a robust bond between the surfaces via the regioselective reaction. In certain aspects, the method further comprises applying a catalyst to the first substrate, the second substrate, or to both after the polymer is applied prior to the reacting. The applying of the catalyst is conducted by contacting one or more regions of a template surface having catalyst disposed thereon with the applied polymer on the substrate. In certain aspects, the applying comprises applying the catalyst and a catalyst reductant to the first and/or second polymer.

In accordance with various aspects of the present disclosure, vapor-based coatings can be used for spatially-controlled click-chemistry of many different types of molecules. The polymer systems having regioselective functional groups, as provided by the present disclosure, provide stable immobilization of one or multiple types of target molecules to a surface. The following description of potential applications is merely exemplary and not limiting, as recognized by those of skill in the art.

In certain aspects, the coatings having a functional group which undergoes a click chemistry regioselective reaction can be used in bioactive surfaces that are used to develop advanced biomaterials and biointerfaces. As a flexible bioconjugation platform, the disclosure provides a regioselective immobilization strategy that is applicable in the design of biofunctional surfaces for fundamental studies of cell biology, bioengineering, diagnostics (e.g., microarrays), biosensors, and/or biomedical device coatings.

For example, in biomedical engineering, the pattern control afforded by the regioselective polymer systems of the disclosure is important for the development of certain types of biosensors or in the study of cell biology, where such applications generally require spatially controlled attachment of ligands. Other similar examples include surface patterning for some biological assays and for combinatorial screening of drugs. In tissue engineering or scaffolds for tissue engineering, the formation of tissue or organized cell structures often requires a specific architecture that allows cells to occupy defined locations on an implant or device, while preventing non-specific adhesion.

Thus, the polymer systems of the present disclosure are optionally employed on surfaces of various applications, including medical devices and implantable biomaterials, for example, intra-corporeal materials (e.g., stents, medical implants, and the like), extra-corporeal medical devices (e.g., catheters, intravenous tubing, dialysis equipment and the like), and tissue engineering applications. In various aspects, the ability to control the spatial orientation of target molecules is highly desirable for such applications. For example, certain proteins, growth factors, or ligands can be oriented on a surface by incorporating a functional group, such as an alkyne or azide, into the molecule to create the desired orientation, thus ensuring bioavailability. Prior techniques did not consistently provide adequate spatial control, as a particular functional group on the molecule would not necessarily react with the desired functional group on a surface, and thus control over the orientation of a molecule at the surface was not certain.

As described above, the click chemistry reactions provide consistent, reliable, and high yield reactions, making them particularly suitable for techniques which provide detection and/or quantification of the presence of certain target molecules. Such applications include bio-arrays and/or bio-assays, to immobilize different various target molecules, ligands, or cells. Further, coated surfaces using click chemistry may include fluidic or microfluidic devices, such as high-throughput screening for pharmaceutical compounds or for immobilization of ligands. The polymer systems of the present disclosure can be used in complex micro-total analytical systems (μTAS) that automate laboratory analysis steps on a microscale. The robust functionalized polymers of the present disclosure are also optionally used for diagnostic techniques, for chromatography techniques or further, can be used to bond two separate coatings together. Such materials systems can be used to fabricate complex three-dimensional microstructures, or can be used as monomolecularly dimensioned interlayers for self-assembled monolayers (SAMs). The teachings of the present disclosure can also be used for electrochemical cell technology, for example, batteries and/or fuel cells for selective reactions conducted therein or in the development of microelectronic elements such as optical displays, circuits, or lasers.

EXAMPLES

Various aspects of the disclosure can be further understood by the specific examples contained herein. Specific examples are provided for illustrative purposes of how to make and use the compositions and methods of this invention and, unless explicitly stated otherwise, are not intended to be a representation that given embodiments of this invention have, or have not, been made or tested.

Example 1

Di-ethynyl[2,2]paracyclophane (50 mg) is sublimed at 90 to 110° C. and carried into the pyrolysis chamber by argon at a flow rate of 20 sccm (standard cubic centimeters per minute). A pressure of 0.5 mbar is used. The pyrolysis temperature appears to impact the resulting polymer composition. The polymer is deposited on the substrate at 15° C. In a first example, a pyrolysis temperature of about 650° C. is used. The IR (grazing angle of 85°): $\tilde{v}$=837, 1039, 1150, 1439, 1505, 1624, 1694, 1910, 2916, 3010, 3048 $cm^{-1}$. XPS (referenced to hydrocarbon at 285.0 eV) analysis shows: C (96.9%), O (3.1%).

Example 2

In a second example, the same conditions as described above in the context of Example 1 are use, however a pyrolysis temperature of about 550° C. is used. IR (grazing angle of 85°): $\tilde{v}$=839.35, 877, 922, 1036, 1261, 1439, 1623, 1913, 2100, 2848, 2921, 3013, 3052, 3285 $cm^{-1}$. XPS (referenced to hydrocarbon at 285.0 eV) analysis shows: C (93.7%); O (6.3%).

Example 3

In a third example, 4-Ethynyl[2,2]paracyclophane (polymer designed "2" in Reaction 1 above) (50 mg) is sublimed at 90-110° C. and at a reduced pressure of 0.5 mbar. Argon, at a flow rate of 20 sccm, is used as the carrier gas, which carries the precursors into the pyrolysis chamber at a temperature of 680° C. The polymer poly(4-ethynyl-p-xylylene-co-p-xylylene) (polymer designed "3" above in Reaction 1) is deposited on the substrate at 15° C. kept in the deposition chamber. IR (grazing angle of 85°): $\tilde{v}$=833, 894, 1158, 1251, 1411, 1454, 1493, 1513, 1605, 1699, 1900, 2102, 2859, 2926, 3015, 3286 $cm^{-1}$; XPS (referenced to hydrocarbon at 285.0 eV): C (98.7%), O (1.3%); XPS signals: 285.6 eV (C1s); 291.7 eV ($\pi$-$\pi$*).

Surface Characterization: Infrared spectroscopy is performed on a Nicolet 6700 spectrometer. XPS elemental analyses is conducted using an Axis Ultra X-ray photoelectron spectrometer (Kratos Analyticals, UK) equipped with a monochromatized Al K$\alpha$ X-ray source. Height analysis data is recorded using an $EP^3$—SW imaging ellipsometer (Nanofilm AG, Germany) at a wavelength of 532 nm. Both, nulling (four zones) and mapping experiments are performed at an angle of incidence of 65°. An anisotropic Cauchy parameterization model is used for curve fitting. For the mapping mode, data is recorded by an imaging scanner with a lateral resolution of 1 µm with a field of view of about 100 µm×500 µm.

Spatially-directed surface modification is determined by microcontact printing of biotinylated ligand (4) on polymer (3). Patterned PDMS stamps are created as previously described above. A thin layer of solution of ligand (4) (Photoprobe biotin, Vector labs, 10 µg/ml) and sodium ascorbate (1 mM) in a 2:1 mixture of water and tert-butyl alcohol is spread on the polymer (3) and the solvent is dried using $N_2$. The patterned PDMS stamp is oxidized for 20 min using UV-ozone cleaner (Jelight Co. Inc) and ink is applied with a $CuSO_4$ solution (1 mM in methanol) using a cotton swab. The stamp is then kept in contact with the polymer substrate for 12-18 hours. After stamp removal, the patterned substrate is incubated with rhodamine-labeled streptavidin (50 µg/ml in aqueous phosphate buffer PBS containing 0.02% (v/v) Tween™20 surface active agent and 0.1% (w/v) bovine serum albumin) for 1 hour. The substrate is then repeatedly washed with the incubating buffer, PBS and finally rinsed with DI-water. The fluorescence micrographs are captured using a Nikon TE200 fluorescence microscope, as shown in FIGS. 3A and 3B microcontact printing in accordance with certain aspects of the disclosure. FIGS. 3A and 3C, where fluorescence micrographs show the binding of TRITC-steptavidin in the light regions (and non-binding in dark regions).

The description contained in the disclosure is merely exemplary in nature and, thus, variations that do not depart from the gist of the invention are intended to be within the scope of the invention. Such variations are not to be regarded as a departure from the spirit and scope of the invention.

What is claimed is:

1. A robust polymer composition deposited on a substrate comprising:
a polymer deposited by chemical vapor deposition comprising a substituted xylylene comprising a first functional group that is reactive with and undergoes a regioselective reaction with a second functional group on a target molecule.

2. A robust polymer composition according to claim 1, wherein the first functional group and the second functional group react via a reaction selected from the group consisting of: a cycloaddition reaction; a nucleophilic substitution reaction-ring opening reaction; a carbonyl reaction of the non-aldol type, and addition to carbon-carbon multiple bonds.

3. A robust polymer composition according to claim 1, wherein the first functional group and second functional group react via a cycloaddition reaction.

4. A robust polymer composition according to claim 3, wherein said cycloaddition reaction is selected from a [1,3]-dipolar cycloaddition and a [2,4]-cycloaddition (Diels-Alder).

5. A robust polymer composition according to claim 1, wherein the first functional group is selected from: an alkyne, an azide, a ketone, a hydrazine, a diene, a dienophile, and mixtures thereof.

6. A robust polymer composition according to claim 1, wherein the first functional group is selected from the group consisting of an alkyne and an azide.

7. A robust polymer composition according to claim 1, wherein the first functional group comprises an alkyne and the second functional group comprises an azide.

8. A robust polymer composition according to claim 1, wherein the first functional group comprises an azide and the second functional group comprises an alkyne.

9. The robust polymer composition according to claim 1, wherein the polymer has a general structure:

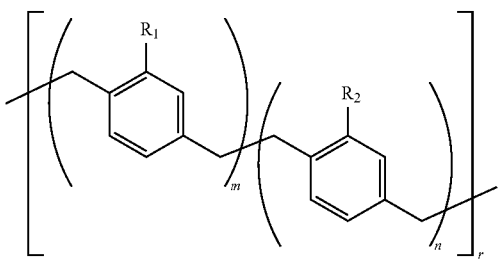

Wherein $R_1$ is selected from the group consisting of: H; C≡CH; C≡CR; wherein R is an alkyl group defined by $C_nH_{2n+1}$, where "n" ranges from 3 to 8; an azide ($N_3$), a ketone, a hydrazine, a diene, a dienophine, and mixtures thereof;

$R_2$ is selected from the group consisting of: H; C≡CH; C≡CR; where wherein R is an alkyl group defined by $C_nH_{2n+1}$, where "n" ranges from 3 to 15; an azide ($N_3$); a ketone, a hydrazine, a diene, a dienophine, and mixtures thereof; and wherein "m" and "n" are 0 to about 150 and "r" is about 1 to about 2000.

10. The robust polymer composition according to claim 1, wherein the polymer is formed by pyrolysis and chemical vapor deposition polymerization of a compound represented by the general structure:

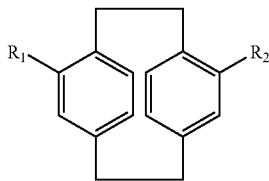

Wherein $R_1$ and $R_2$ are each independently selected from the group consisting of: H; C≡CH; C≡CR, where wherein R is an alkyl group defined by $C_nH_{2n+1}$, where "n" ranges from 3 to 15, an azide ($N_3$), a ketone, a hydrazine, a diene, a dienophine, and mixtures thereof.

11. The polymer system according to claim 10, wherein the compound (a) is:
i) sublimed at about 90° C. to about 110° C.;
ii) pyrolyzed at a temperature of greater than about 650° C. at about 0.5 mbar; and
iii) polymerized at a temperature of about 0° C. to about 25° C. at about 0.5 mbar.

12. A method of forming a robust reactive polymer on a substrate, the method comprising:
applying a polymer via chemical vapor deposition, wherein the polymer comprises a substituted xylylene comprising a first functional group that undergoes a regioselective reaction with a second functional group on a target molecule.

13. A method according to claim 12, wherein prior to the applying of the polymer, a precursor species that forms the polymer is sublimed.

14. A method according to claim 12, wherein prior to the applying of the polymer, a precursor species that forms the polymer is pyrolyzed.

15. A method according to claim 12, wherein prior to the applying of the polymer, a precursor species that forms the polymer is:
i) sublimed at about 90° C. to about 110° C.;
ii) pyrolyzed at a temperature of greater than about 650° C. at about 0.5 mbar; and
iii) polymerized at a temperature of about 0° C. to about 25° C.

16. A method of forming a robust functional surface comprising:
applying a polymer via chemical vapor deposition to a substrate, wherein the polymer comprises a substituted xylylene comprising a first functional group that undergoes a regioselective reaction with a second functional group on a target molecule; and
reacting the first functional group with the second functional group to attach the target molecule to the surface.

17. A method according to claim 16, further comprising applying a catalyst to the substrate after the polymer is applied prior to the reacting.

18. A method according to claim 17, wherein the applying of the catalyst is conducted by contacting one or more regions of a template surface having catalyst disposed thereon with the applied polymer on the substrate.

19. A method according to claim 17, wherein the applying comprises applying the catalyst and a catalyst reductant to the applied polymer.

20. A method according to claim 16, wherein the polymer comprising the first functional group is applied to a first substrate and the target molecule having the second functional group is applied to a second substrate, wherein the first functional group is reacted with the second functional group to form a robust bond between the first substrate with the second substrate.

* * * * *

UNITED STATES PATENT AND TRADEMARK OFFICE
CERTIFICATE OF CORRECTION

PATENT NO.        : 7,909,928 B2
APPLICATION NO.   : 11/691210
DATED             : March 22, 2011
INVENTOR(S)       : Joerg Lahann et al.

It is certified that error appears in the above-identified patent and that said Letters Patent is hereby corrected as shown below:

Column 6, line 57, after "xylylene-co-p-xylylene", insert --)--.

Column 9, line 2, "bond" should be --bonded--.

Column 11, line 37, "use" should be --used--.

Column 13, line 22, Claim 9, "where wherein" should be --wherein--.

Column 13, lines 42-43, Claim 10, "where wherein" should be --wherein--.

Signed and Sealed this
Thirteenth Day of September, 2011

David J. Kappos
*Director of the United States Patent and Trademark Office*